US007925688B2

(12) United States Patent
Mampaey et al.

(10) Patent No.: US 7,925,688 B2
(45) Date of Patent: Apr. 12, 2011

(54) METHOD FOR SELECTING AN APPLICATION SERVER, A RELATED CALL SESSION CONTROL NETWORK ELEMENT, A RELATED PRIMARY APPLICATION SERVER AND A RELATED CALLED USER TERMINAL

(75) Inventors: Marcel Joseph Louis Mampaey, Brussels (BE); Jean Vosters, Temse (BE)

(73) Assignee: Alcatel, Paris (FR)

( * ) Notice: Subject to any disclaimer, the term of this patent is extended or adjusted under 35 U.S.C. 154(b) by 1940 days.

(21) Appl. No.: 10/849,185

(22) Filed: May 20, 2004

(65) Prior Publication Data
US 2004/0260815 A1   Dec. 23, 2004

(30) Foreign Application Priority Data

Jun. 12, 2003   (EP) .................................. 03291393

(51) Int. Cl.
*G06F 15/16*   (2006.01)

(52) U.S. Cl. ..... 709/200; 709/217; 709/227; 273/88.17; 455/899

(58) Field of Classification Search .................. 709/217, 709/227, 200; 455/899; 379/88.17
See application file for complete search history.

(56) References Cited

U.S. PATENT DOCUMENTS

| | | | | |
|---|---|---|---|---|
| 5,953,397 A | * | 9/1999 | Lee ........................... | 379/100.16 |
| 6,880,156 B1 | * | 4/2005 | Landherr et al. .............. | 718/105 |
| 6,909,708 B1 | * | 6/2005 | Krishnaswamy et al. .... | 370/352 |
| 6,954,654 B2 | * | 10/2005 | Ejzak ............................ | 455/560 |
| 2002/0160776 A1 | | 10/2002 | Torabi | |
| 2003/0125085 A1 | * | 7/2003 | Collins .......................... | 455/560 |
| 2004/0010473 A1 | * | 1/2004 | Hsu et al. ........................ | 705/77 |

FOREIGN PATENT DOCUMENTS

WO   WO 03/030429 A2   4/2003

OTHER PUBLICATIONS

3rd Generation Partnership Project; Technical Specification Group Core Network; IP Multimedia (IM) Session Handling; IP Multimedai (IM) call model; Stage 2 (Release 5) with reference 3GPP TS 23.218 V5.2.0 Sep. 2002.
TINAC: "RET Reference Point Specifications version 1.1", TINAC, Online!, Apr. 30, 1999, pp. 1-88, XP002254865.
TINAC: "Service Architecture version 5.0" Tina Consortium, 'Online!, Jun. 16, 1997, pp. 123-134, XP002254866.
ETSI UMTS: Ip multimedia (IM) Session Handling, IM Call Model, Stage 2 *GPP TS 23.218v.5.4.0 Release 5) ETSI UMTS, 'Online! Mar. 2003, XP002254867.

* cited by examiner

*Primary Examiner* — Ario Etienne
*Assistant Examiner* — El Hadji Sall
(74) *Attorney, Agent, or Firm* — Sughrue Mion, PLLC

(57) ABSTRACT

The present invention relates to a method for selecting an Application Server in an Internet Protocol multimedia network upon reception of an Internet Protocol Multimedia call destined to a called party terminal. This method at first comprises the step of a call session control network element intercepting the incoming IP multimedia call. Subsequently, the call session control Network element upon intercepting of the incoming IP multimedia call activates a dedicated primary application server. The primary application server, upon analysis of the incoming IP multimedia call presents the incoming IP multimedia call to the called party terminal together with a set of service applications for answering said incoming call. This set of service applications is determined in the analysis. The call session control Network element receives a selection of at least one service application from the set of service applications forwarded by said called party terminal.

10 Claims, 2 Drawing Sheets

METHOD FOR SELECTING AN APPLICATION SERVER, A RELATED CALL SESSION CONTROL NETWORK ELEMENT, A RELATED PRIMARY APPLICATION SERVER AND A RELATED CALLED USER TERMINAL

The present invention relates to a Method for selecting an Application Server as described in the preamble of claim 1, to a related Call Session Control Function network element as described in the preamble of claim 3, a Primary Application Server as described in the preamble of claim 5 and to a called user terminal as described in the preamble of the respective claim 9.

BACKGROUND OF THE INVENTION

Such a method and related devices are already known in the art, e.g. from "3rd Generation Partnership Project; Technical Specification Group Core Network; IP Multimedia (IM) Session Handling; IP Multimedia (IM) call model; Stage 2 (Release 5) with reference 3GPP TS 23.218 V5.2.0 (2002-09)". This document is published by the 3rd Generation Partnership Project (3GPP) in September 2002.

Especially Annex C of this document, discloses an example for activating Application Servers using filter criteria for triggering an Application Server, i.e. the way Application Servers are selected and respectively invoked by the Call Session Control Function based on the content of filter criteria.

An incoming call to a particular user is intercepted by the call control network element, called the Call Session Control Function, which is in charge of serving the called user. The Call Session Control Function Network Element has been pre-configured with this user's triggering data. When trigger conditions, called filter criteria, are met a certain Application Server is to be contacted and will receive the control of this incoming call. Several Application Servers can be contacted in sequence in a certain call.

The triggering conditions describe a list of filter criteria each being linked to an application server for executing a corresponding Application service. For a number of specific cases to be described in the filter criteria a specific application is automatically pre-selected based on the triggering data for taking the control of the incoming call.

SUMMARY OF THE INVENTION

In this model of selecting Application Servers, there is no means to provide the called user with the possibility to select the Application Servers for handling the incoming call himself as the sequence of activation of call servers dealing with specific application services is predefined in the triggering conditions.

An object of the present invention is to provide a called user with a method for selecting application servers of the above known type but wherein the called user is enabled to answer an incoming call using service applications selectable by the called user. According to the invention, this object is achieved by the method as claimed in claim 1, the related Call Session Control Function network element as claimed in claim 3 together with the Primary Application Server as claimed in claim 5 and the called user terminal as claimed in claim 9.

Indeed due to the fact that a dedicated primary application server is activated upon interception of an incoming call and that this primary application server upon analysis of an incoming IP multimedia call is able to present this incoming IP multimedia call to the called party together with a set of service applications for answering the incoming IP multimedia call, where the set of service applications is determined in the analysis of the incoming call, and the called party may subsequently select at least one service application from the presented set of service applications, the call session control network element (CSCF) based on this at least one selected service application is able to handle the incoming call by invoking at least one Application Server (AS1 . . . Asn) corresponding to this at least one selected service application.

An additional characteristic feature of the present invention relates to the method as described in claim 2 and the call session control network element as described in claim 4.

The call session control network element further is able to invoke the at least one secondary Application Server that corresponds to the at least one selected service application.

In this way the call is amongst others handled by the at least one selected service application.

A further characteristic feature of the present invention is described in claim 6.

The call presentation information forwarding means of the primary application server is adapted to forward said call presentation information of said incoming IP multimedia call and/or said set of service applications for answering said incoming call using an HyperText Transfer Protocol session.

An alternative feature of the present invention is described in claim 7.

The call presentation information forwarding means of the Primary Application Server is able to forward the call presentation information of said incoming IP multimedia call and/or said set of service applications for answering said incoming call via an Wireless Application Protocol session.

An alternative feature of the present invention is described in claim 8.

The call presentation information forwarding means of the Primary Application Server is able to forward said call presentation information of said incoming IP multimedia call and/or said set of service applications for answering the incoming call via the Call session control network element (CSCF).

A further characteristic feature of the present invention is described in claim 10.

The application presentation means of the Called Party Terminal is implemented using a web-browser.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein:

DETAILED DESCRIPTION OF EXEMPLARY EMBODIMENT OF THE INVENTION

Figure 1:
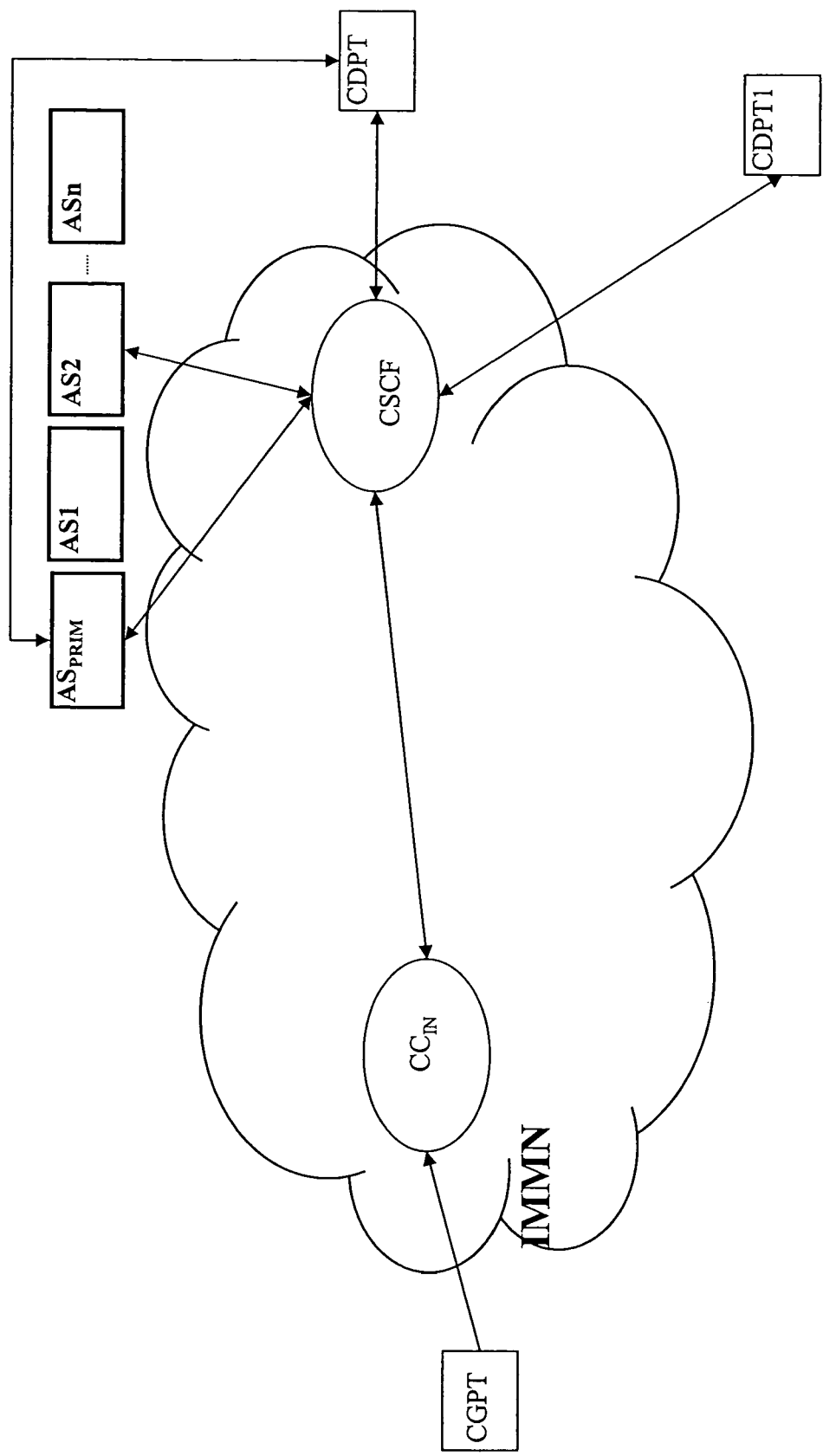
FIG. 1 represents a part of an Internet Protocol Multimedia Network IMMN wherein the application server selection method is applied.
Figure 2:
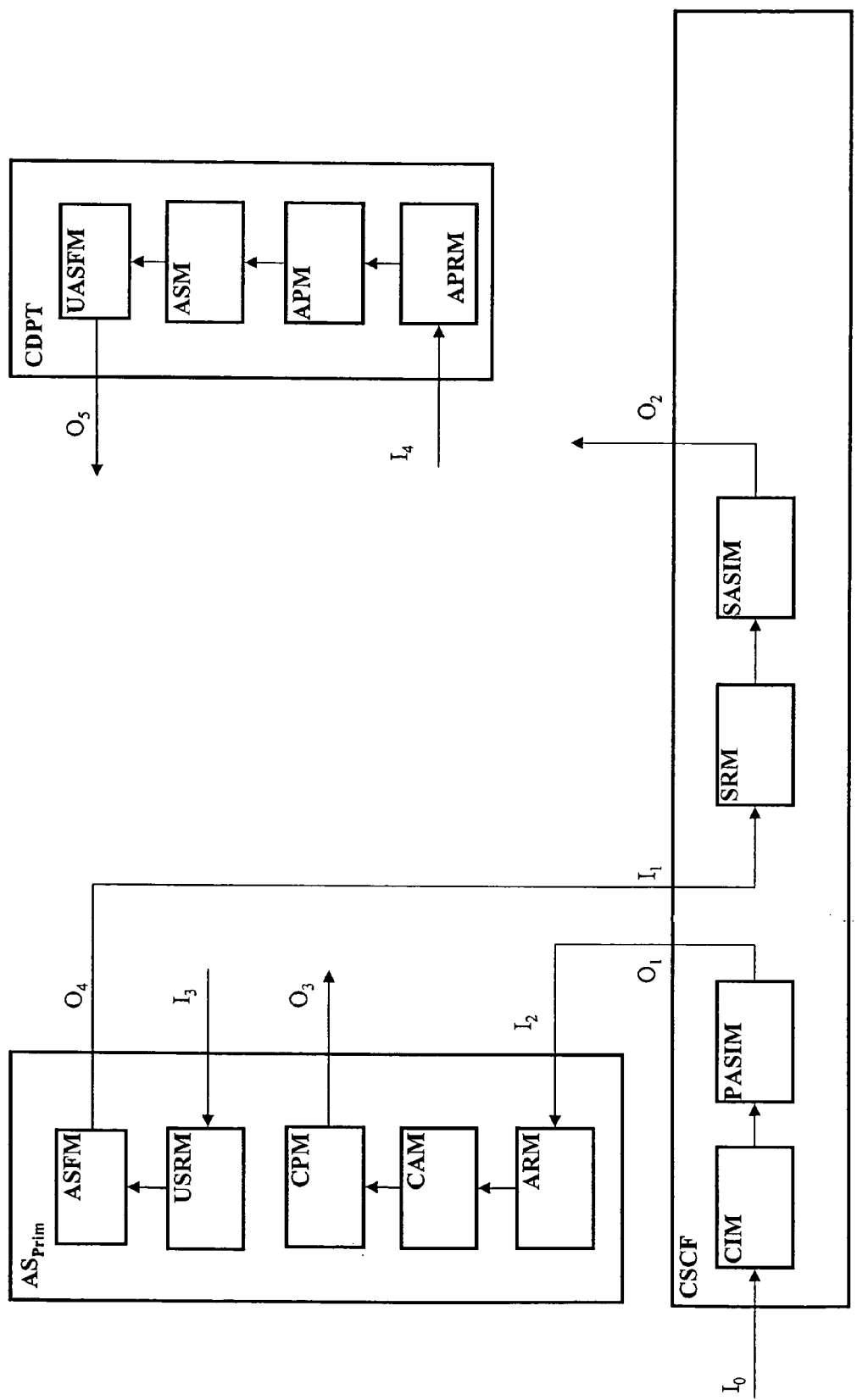
FIG. 2 represents the functional structure of a call session control network element CSCF, a primary application server $AS_{PRIM}$ and a called party terminal CDPT as presented in FIG. 1.

In the following paragraphs, referring to the drawings, an implementation of the method and the related devices according to the present invention will be described. In the first paragraph of this description the main elements of this network as presented in FIG. 1 are described. In the second paragraph, the connections between the before mentioned network elements and described means are defined. Subsequently all relevant functional means of the mentioned network elements are described followed by a description of all interconnections. In the succeeding paragraph the actual execution of the method for session establishment is described.

The part of the Internet Protocol Multimedia Network IMMN presented in FIG. 1 comprises two Call session control network elements CCin, CSCF which deal with establishment of calls between a calling party CGPT and two or more called parties CDPT, CDPT1. The first Call session control network elements CCin is responsible for serving the calling party CGPT and the second Call session control network elements CSCF is responsible for serving the called party CDPT. It is assumed that, but is not mandatory that the second Call session control network elements CSCF is responsible for a second called party terminal CDPT1. Furthermore there is a primary application server $A_{SPRIM}$ that is able to provide a called party CDPT, CDPT1 with the option to select an application server from a set of application servers AS1 ... ASn for answering an incoming call and further a called party terminal CDPT that is adapted to select an application from a set of application services for answering an incoming call. Further there is a calling party terminal CGPT. All user-terminals CGPT and CDPT, CDPT1 are chosen to be a personal computer with a belonging screen and keyboard and a mouse further comprising a microphone and speaker for the provisioning of telephone functionality. Although in this embodiment only two called party terminals CDPT, CDPT1 are presented, it is not excluded that there are more terminals. Moreover there is a plurality of Application servers AS1 ... ASn that provide the called party with services such as additional methods of payment (possibly assisted with additional interfacing possibilities such as e.g. a Web interface), additional means of controlling the call e.g. for adding, modifying, or deleting resources involved in the call, such as media resources, or monitoring or recording equipment, also possibly assisted with additional interfacing possibilities such as a Web interface, etc. It is to be noted that the completion of the call can be conditioned to the availability of these resources, depending on user preferences and/or user subscriptions.

Although there can be more than three user terminals CGPT, CDPT and CDPT1 and more than two Call session control network elements CCin and CSCF in such an internet protocol multimedia network, only these elements are described in this embodiment in order to keep simplicity.

The calling party terminal CGPT is coupled to the first Call session control network element CCin over an Internet protocol link, further referred to as an IP-link. Further this first Call session control network element CCin is coupled to the second Call session control network element CSCF over an IP-link and the called party terminal CDPT is also coupled to the Call session control network element CSCF over an IP-link. Moreover, the primary application server $AS_{PRIM}$ and the further application servers AS1 ... ASn each is coupled to the second Call session control network elements CSCF using an IP-link. The network elements communicate using Session Initiation Protocol Messages. Alternatively it is possible to use the protocols from the H.323 protocol family as appropriate.

The Call session control network element CSCF comprises a call intercepting means CIM that is able to intercept an incoming IP multimedia call and a Primary Application Server invocation means PASIM that is able to invoke, upon intercepting an incoming IP multimedia call, a primary Application Server $AS_{PRIM}$ and forward call data corresponding to said incoming IP multimedia call to said Primary Application Server $AS_{PRIM}$. The Call session control network element CSCF further comprises a Selection receiving means SRM that is adapted to receive from said Primary Application Server $AS_{PRIM}$ a selection of at least one service application forwarded by the called party terminal CDPT and a Secondary Application server invocation means SASIM that is able to activate based on the at least one selected service application at least one secondary Application Server AS1 ... ASn corresponding to the at least one selected service application.

If there is more than one Application Service selected each of the selected application servers are subsequently activated.

The Primary Application Server $AS_{PRIM}$ comprises an activation message reception means ARM that is adapted to receive call data corresponding to the incoming IP multimedia call forwarded by said Call Session Control network element CSCF, a call analysis means CAM that is able to analyse the incoming IP multimedia call and based on this analysis determine a set of service applications for answering the incoming call and a call presentation information forwarding means CPM that is adapted to forward, upon analysis of the incoming IP multimedia call, the call presentation information of the incoming IP multimedia call to the called party terminal CDPT together with a presentation of a set of service applications for answering the incoming call. The set of service applications wherefrom the user may select service applications is determined in the analysis of the incoming IP Multimedia call.

Furthermore the Primary Application Server $AS_{PRIM}$ is built up of a user selection reception means USRM that is able to receive from the called party terminal CDPT a selection of at least one service application from the set of service applications forwarded by the called party terminal CDPT and an application selection forwarding means ASFM that is able to forward this selection of at least one service application from the set of service applications forwarded by the called party terminal CDPT towards the call session control Network element CSCF.

The final relevant network element is the Called Party Terminal CDPT for selecting an Application Server in an Internet Protocol multimedia network IMMN upon reception of an Internet Protocol Multimedia Call by the Call Session Control network element CSCF. This Called Party Terminal CDPT is built up of an Application Presentation Reception means APRM that is able to receive call presentation information of the incoming IP multimedia call together with a presentation of a set of service applications for answering the incoming call from the Primary Application Server $AS_{PRIM}$ and an application presentation means APM that is able to make a call presentation of the incoming IP multimedia call to the called party terminal CDPT together with a presentation of a set of service applications for answering the incoming call. The Called Party Terminal CDPT further comprises an application selection means ASM that is adapted to select at least one service application of the presented set of service applications forwarded by the called party terminal CDPT and a user application selection forwarding means UASFM that is adapted to forward a selection of at least one service application of the set of service applications forwarded by the called party terminal CDPT towards the call session control Network element CSCF.

The call intercepting means CIM of the call session control Network element CSCF has an input-terminal that is at the same time an input-terminal $I_0$ of the call session control Network element CSCF. The call intercepting means CIM further possess an output that is coupled to an input of the Primary Application Server invocation means PASIM which in its turn possess an output-terminal that is at the same time an output-terminal terminal $O_1$ of the call session control Network element CSCF.

The Selection receiving means SRM has an input-terminal.that is at the same time an input-terminal $I_1$ of the call session control Network element CSCF and an output that is coupled to an input of the Secondary Application server invocation means SASIM that further possess an output-terminal that is at the same time an output-terminal $O_2$ of the call session control Network element CSCF.

The activation message reception means ARM of the Primary Application Server $AS_{PRIM}$ has an input-terminal that is at the same time an input-terminal $I_2$ of the Primary Application Server $AS_{PRIM}$. Furthermore, the activation message reception means ARM possess an output that is coupled to an input of the call analysis means CAM that in its turn is coupled with an output to an input of the call presentation information forwarding means CPM. The call presentation information forwarding means CPM has an output-terminal that is at the same time an output-terminal $O_3$ of the Primary Application Server $AS_{PRIM}$. The user selection reception means USRM has an input-terminal that is at the same time an input-terminal $I_3$ of the Primary Application Server $AS_{PRIM}$. This user selection reception means USRM further is coupled with an output to an input of the application selection forwarding means ASFM. Moreover the application selection forwarding means ASFM has an output-terminal that is at the same time an output-terminal $O_4$ of the Primary Application Server $AS_{PRIM}$.

The Application Presentation Reception means APRM of the called party terminal CDPT possess an input-terminal that is at the same time an input-terminal $I_4$ of the called party terminal CDPT and an output that is coupled to an input of the application presentation means APM that in its turn is coupled with an output to an input of the application selection means ASM. Furthermore the application selection means ASM is coupled with an output to an input of the user application selection forwarding means UASFM. The user application selection forwarding means UASFM possess an output-terminal that is at the same time an output-terminal $O_5$ of the called party terminal CDPT.

The Primary Application Server $AS_{PRIM}$ is coupled with its output-terminal $O_3$ to input-terminal $I_4$ of the called party Terminal CDPT. Additionally, the Primary Application Server $AS_{PRIM}$ is coupled with its input-terminal $I_3$ to output-terminal $O_5$ of the called party Terminal CDPT.

In order to explain the operation of the present invention it is assumed that the calling party uses its terminal CGPT for setting up a call to the called user party terminal CDPT. It is supposed that the calling user party therefore makes use of a well known phone application (or any special application he might have for making calls such as voice or multimedia calls) at his terminal. The signalling in the call set-up is performed using the session initiation protocol by sending a SIP INVITE message towards the second call session control network element CSCF via the first call session control network element $CC_{IN}$. The handling of the SIP message at the first call session control network element $CC_{IN}$ is not relevant for explaining the present invention and is as a consequence not described. The SIP INVITE message is forwarded to the call session control network element CSCF.

The call intercepting means CIM of the Call Session Control network element CSCF intercepts the incoming IP multimedia call i.e. the SIP INVITE message. The message is forwarded towards the Primary Application Server invocation means PASIM that invokes, upon intercepting the incoming IP multimedia call, a primary Application Server $AS_{PRIM}$ by forwarding call data corresponding to the incoming IP multimedia call to this Primary Application Server $AS_{PRIM}$, with possibly additional information that is part of the called party user profile that is contained in the CSCF.

The activation message reception means ARM of the Primary Application Server $AS_{PRIM}$ then receives the call data corresponding to said incoming IP multimedia call, i.e. the SIP INVITE message forwarded by the Call Session Control network element CSCF. At forwarding of this call data, the call analysis means CAM analyses this incoming IP multimedia call and based on this analysis determines a set of service applications for answering the incoming call; the elements of information that are analysed by the CAM are parts of the call data, i.e. parts of the SIP INVITE message, which are called in the 3GPP standard Service Point Triggers (SPTs), and parts or all of the data that was possibly added by the CSCF.

It is assumed that after analysis it appears that the called party has the option to answer the call for instance as an ordinary phone call, to additionally record this call, to establish a three party call or to establish a connection with a certain Quality of Service It is to be noted that any combination of features is possible.

It is further assumed that the called party at reception of the incoming call wants to record the call as evidence of content of the spoken words could be useful for some reason and additionally it is necessary to involve a third party in the call for instance for provisioning expert knowledge.

Subsequently, the call presentation information forwarding means CPM forwards, upon analysis of the incoming IP multimedia call, call presentation information of the incoming IP multimedia call to the called party terminal CDPT together with a presentation of a set of service applications for answering the incoming call. This presentation may be done using a dedicated HTTP session and an internet browser running at the called party terminal CDPT for presenting the set of service applications and facilitating to select service application from this set of applications. This set of service applications is determined in the analysis. Alternatively, the forwarding of the set of service applications may also be performed towards the call session control network element CSCF that in its turn forwards the data towards the called party terminal CDPT. The Application Presentation Reception means APRM of the called party Terminal CDPT receives the call presentation information of the incoming IP multimedia call together with the presentation of the set of service applications for answering the incoming call from the Primary Application Server $AS_{PRIM}$. Subsequently, the application presentation means APM deals with the call presentation, of said incoming IP multimedia call to the called party terminal CDPT together with a set of service applications for answering the incoming call. The presentation means may be an internet browser that displays the information corresponding to the incoming call on the screen of the user terminal. Here it is assumed that the called party at reception of the incoming call wants to record the call as evidence of content of the spoken words which could be useful for some reason and additionally it is necessary to involve a third party in the call for provisioning expert knowledge. The recording of the conversation is to be performed by activating a corresponding service application to be executed by a secondary application server, assume application server AS1. The establishment of the three party call, that is making a selection of the third party to be involved in the call from a list and subsequently adding this selected party to the call parties is to be performed by activating a corresponding service application to be executed by another secondary application server, assume application server AS2.

The selection of service applications as presented on the screen of the called party terminal CDPT is dealt with by the application selection means ASM. This application selection means ASM for instance comprises a mouse for selecting the service applications by clicking icons representing the service applications on the screen of the called user party terminal CDPT. The user then selects application service AS1 and subsequently application service AS2 by clicking the corresponding icons on the screen or by dragging and dropping these icons in a special area or window called activation window. Then the user application selection forwarding means UASFM will forward the selection of the service applications AS1, AS2 from the set of service applications AS1 ... ASn forwarded by the called party terminal CDPT towards the user selection reception means USRM of the Primary Application Server $AS_{PRIM}$. The user selection reception means USRM of the Primary Application Server $AS_{PRIM}$, receives the selection of the service applications AS1, AS2 forwarded by said called party terminal CDPT and subsequently forwards this selection towards the application selection forwarding means ASFM that in its turn forwards this selection towards the call session control Network element CSCF. The Selection receiving means SRM of the call session control network element CSCF then receives from said Primary Application Server $AS_{PRIM}$ this selection of the service applications AS1, AS2. Subsequently, the Secondary Application server invocation means SASIM activates based on the selection of service applications SA1, SA2 subsequently the secondary Application Servers AS1, AS2 that correspond to the selected service applications AS1, AS2.

The activated secondary Application Server(s) perform their function, i.e. initialise the recording tool and subsequently provide the called user party terminal with an option to select the third party that should be involved in the call.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for selecting an Application Server in an Internet Protocol multimedia network (IMMN) upon reception of an Internet Protocol Multimedia call destined to a called party terminal (CDPT), said method comprising the step of:
   a. a call session control network element (CSCF) intercepting said incoming IP multimedia call, characterised in that said method further comprises the following steps:
   b. said call session control Network element (CSCF) upon intercepting said incoming IP multimedia call activating a dedicated primary application server ($AS_{Prim}$);
   c. said primary application server ($AS_{Prim}$), upon analysis of said incoming IP multimedia call presenting said incoming IP multimedia call to said called party terminal (CDPT) together with a set of service applications for answering said incoming call, said set of service applications being determined in said analysis; and
   d. said call session control Network element (CSCF) receiving a selection of at least one service application from said set of service applications forwarded by said called party terminal (CDPT).

2. The method for selecting an Application Server according to claim 1, characterised in that said method further comprises the step of:
said call session control network element (CSCF) based on said at least one selected service application invoking at least one secondary Application Server (AS1 ... ASn) corresponding to said at least one selected service application.

3. A call Session Control network element (CSCF) for selecting an Application Server in an Internet Protocol multimedia network (IMMN) upon reception of an Internet Protocol Multimedia call destined to a called party terminal (CDPT) by said Call Session Control network element (CSCF), said Call Session Control network element (CSCF) comprising a call intercepting means (CIM) adapted to intercept an incoming IP multimedia call, characterised in that said Call Session Control network element (CSCF) further comprises:
   a. a Primary Application Server invocation means (PASIM), coupled with an input to an output of said call intercepting means (CIM) and adapted to invoke upon intercepting said incoming IP multimedia call a primary Application Server ($AS_{PRIM}$) and forward call data corresponding to said incoming IP multimedia call to said Primary Application Server ($AS_{PRIM}$); and
   b. a Selection receiving means (SRM), configured to receive from said Primary Application Server ($AS_{PRIM}$) a selection of at least one service application from said set of service applications forwarded by said called party terminal (CDPT).

4. The call Session Control network element (CSCF) according to claim 3, characterised in that said Call Session Control network element (CSCF) further comprises a Secondary Application server invocation means (SASIM), coupled with an input to an output of said Selection receiving means (SRM) and adapted to activate based on said at least one selected service application at least one secondary Application Server (AS1 ... ASn) corresponding to said at least one selected service application.

5. A primary Application Server ($AS_{PRIM}$) for selecting an Application Server in an Internet Protocol multimedia network (IMMN) upon reception of an Internet Protocol Multimedia destined to a called party terminal (CDPT), by a Call Session Control network element (CSCF), said Primary Application Server comprising the following means:
   a. an activation message reception means (ARM), adapted to receive call data corresponding to said incoming IP multimedia call forwarded by said Call Session Control network element (CSCF);
   b. a call analysis means (CAM), coupled with an input to an output of said activation message reception means (ARM) and configured to analyse said incoming IP multimedia call and based on said analysis determine a set of service applications for answering said incoming call;

c. a call presentation information forwarding means (CPM), coupled with an input to an output of said call analysis means (CAM) and adapted to forward, upon analysis of said incoming IP multimedia call, call presentation information of said incoming IP multimedia call to said called party terminal (CDPT) together with a set of service applications for answering said incoming call, said set of service applications being determined in said analysis; and d. a user selection reception means (USRM), adapted to receive from said called party terminal (CDPT) a selection of at least one service application of said set of service applications forwarded by said called party terminal (CDPT); and e. an application selection forwarding means (ASFM), coupled with an input to an output of said a user selection reception means (USRM) and adapted to forward said selection of at least one service application of said set of service applications forwarded by said called party terminal (CDPT) towards said call session control Network element (CSCF).

6. The primary Application Server ($AS_{PRIM}$) according to claim 5, characterised in that said call presentation information forwarding means (CPM) is adapted to forward said call presentation information of said incoming IP multimedia call and/or said set of service applications for answering said incoming call via an HyperText Transfer Protocol session.

7. The primary Application Server ($AS_{PRIM}$) according to claim 5, characterised in that said call presentation information forwarding means (CPM) is adapted to forward said call presentation information of said incoming IP multimedia call and/or said set of service applications for answering said incoming call via an Wireless Application Protocol session.

8. The primary Application Server ($AS_{PRIM}$) according to claim 5, characterised in that said call presentation information forwarding means (CPM) is adapted to forward said call presentation information of said incoming IP multimedia call and/or said set of service applications for answering said incoming call via said Call session control network element (CSCF).

9. A called Party Terminal (CDPT) for selecting an Application Server in an Internet Protocol multimedia network (IMMN) upon reception of an Internet Protocol Multimedia by a Call Session Control network element (CSCF), characterised in that said Called Party Terminal (CDPT) comprises:

a. an Application Presentation Reception means (APRM), adapted to receive call presentation information of said incoming IP multimedia call together with a set of service applications for answering said incoming call from said Primary Application Server ($AS_{PRIM}$);

b. application presentation means (APM), coupled with an input to an output of said Application Presentation Reception means (APRM) and adapted to make a call presentation, of said incoming IP multimedia call to said called party terminal (CDPT) together with a set of service applications for answering said incoming call;

c. application selection means (ASM), coupled with an input to an output of said application presentation means (APM) and configured to select at least one service application of said set of service applications forwarded by said called party terminal (CDPT); and d. user application selection forwarding means (UASFM), coupled with an input to an output of said application selection means (ASM) adapted to forward a selection of at least one service application of said set of service applications forwarded by said called party terminal (CDPT) towards said call session control Network element (CSCF).

10. The called Party Terminal (CDPT) according to claim 9, characterised in that said application presentation means (APM) is a web-browser.

* * * * *